United States Patent

[11] 3,631,516

[72] Inventor William J. Puchik
Verona, N.J.
[21] Appl. No. 846,050
[22] Filed July 30, 1969
[45] Patented Dec. 28, 1971
[73] Assignee Nashua Corporation
Nashua, N.H.

[54] RECORDING CHART
7 Claims, 8 Drawing Figs.

[52] U.S. Cl. .......... 346/137, 346/24
[51] Int. Cl. .......... G01d 15/32
[50] Field of Search .......... 346/137, 24

[56] References Cited

UNITED STATES PATENTS 1,483,039 2/1924 Bickel .......... 346/137 X
2,938,760 5/1960 Hollein .......... 346/137
3,176,309 3/1965 Chatelain .......... 346/137

*Primary Examiner*—Joseph W. Hartary
*Attorney*—Kenway, Jenney & Hildreth

ABSTRACT: A tachograph for recording information during a number of identical, successive time intervals on a stack of disks rotatable in unison past a stylus. Rotation of the stack past the stylus is accomplished within one of the time intervals. Each disk has a window which exposes the next lower disk of the stack. After the uppermost disk has rotated through one full time interval it is separated from the hub and held stationary, and the remaining lower disks continue to rotate, and the stylus then bears against the uppermost of the rotating disks through the stationary window of the separated disk. The disks are separable from the hub by means of a weakened score line which circumscribes the hub and separation is effected by a fixed detent which engages the edge of the window after the disk has been rotated fully through the time interval period.

INVENTOR
WILLIAM J. PUCHIK
BY Kenway, Jenney & Hildreth
ATTORNEYS

INVENTOR
WILLIAM J. PUCHIK
BY Kenway, Jenney & Hildreth
ATTORNEYS

INVENTOR
WILLIAM J. PUCHIK

BY Kenway, Jenney & Hildreth

ATTORNEYS

RECORDING CHART

SUMMARY OF THE INVENTION

My invention relates to recording devices, such as tachographs, which record information during a number of equal and successive time intervals and more particularly, to an improved tachograph and package of recording charts for use with such tachographs. Recorders of this type commonly are referred to as "seven day recorders" although, of course, they may be used to record data over other time periods. These recorders may be employed in a wide variety of applications. Among the more common applications are in trucks or other vehicles to record such parameters as engine speed, down time, r.p.m. etc.

The information is recorded on a number of stacked charting disks which are supported for rotation in unison on a turntable so that a stylus may track on the surface of the uppermost of the rotating disk. The stylus is movable radially on the disks in response to the input from the parameter being monitored to chart its pattern in polar coordinates. Each disk is formed with a window so that the disk immediately below may be exposed to the stylus through the window. The arc subtended by the charting portion of each disk extends from one edge of the window around the chart to the other, opposite edge of the window, the drive mechanism for turning the disks being arranged to rotate through one full recording arc during one time interval. Thus, in a 7-day recorder, there would be seven charting disks in the stack, the stack being rotated through one recording arc each day. The disks are arranged in the stack so that after each disk has been rotated through its recording arc, the stylus will drop through the window of that disk onto the charting surface of the next lower disk in the stack.

In operating these recorders, the stack of disks is positioned on the turntable and with respect to the stylus so that the stylus bears on the uppermost disk at the beginning of the chart on that disk (just beyond the leading edge of the window of that disk). The turntable is rotated by suitably timed drive means to rotate the stack at the desired speed. Continued rotation of the stack presents the trailing edge of the window to the stylus and the stylus then rides off that disk and protrudes through the window onto the next succeeding disk. The upper, used disk then is prevented from rotating with the lower disk by a detent which engages the leading edge of the window of the upper disk. The detent is arranged to engage and stop the used disk in a position in which the stylus is disposed centrally within the window of the stopped disk. Continued rotation of the turntable causes the lower disks to rotate so that the uppermost of the lower disks continues to rotate past the stylus.

As the recorder continues to operate with the stylus tracking on the second disk through the window of the first, stationary disk, the second disk will rotate through one time interval at which time its window will reach the stylus. The stylus then will ride off the second disk onto the third disk which is exposed through the window of the second disk. The leading edge of the window of the second disk then engages the detent and is stopped in the same manner as was the first disk. The windows of the stopped disks engages the detent in identical manner and thus are stopped disks engages the detent in identical manner and thus are stopped in registry with each other. This mode of operation continues until all of the disks have been used.

The present invention relates to an improved arrangement for rotating the disks in unison yet which enables the disks to be stopped successively while the lower, succeeding disks continue to rotate.

An arrangement, disclosed in U.S. Pat. No. 2,739,031 suggests a stack of disks which are taped to each other about their periphery. When the uppermost disk of the rotating stack has been rotated through its recording act a knife is employed to slit the tape which connects the used disk with the other disks in the rotating stack. Once the tape is slit the remaining, lower disks may rotate in unison while the used disk is maintained in a stationary position. It is among the primary objects of my invention to provide an arrangement in which the disks may be detached, individually and in succession, from the stack, without the use of tape-severing mechanism. Additionally, it should be noted that in the previous technique in which the disks are secured in the stack by tape strips, the initial assembly of the disks in their desired relative angular displacement requires the use of jigs or other aids and complicated manipulation of the tape and disk in order to orient each disk properly within the stack. In contrast, the instant invention permits a relatively simple assembly of the disks, without the need for jigs or other positioning aids.

It is among the objects of my invention to provide a stack of disks which are rotatable in unison without requiring that the disks be secured to each other.

Another object of my invention is to provide a stack of disks which may be assembled accurately and easily in a desired angular relative position.

A further object of my invention is to provide an improved tachograph adopted for use with the stack of recording disks described herein.

Also among the objects of my invention is to provide a stack of recording disks which maybe used with existing tachographs as well as with the improved tachographs disclosed herein.

The foregoing objects of my invention are obtained by providing a number of disks, each of which has an inner disk portion and an outer disk portion. The inner and outer disk portions are defined, on each disk, by a weakened score line which surrounds the central axis of rotation of the disk. The inner portion of each disk is mounted securely to a spindle and the turntable for rotation in unison therewith. As the spindle and turntable rotate, the stack is rotated until the uppermost of the rotating disks eventually completes its rotation and the stylus rides off that disk onto the next succeeding disk which is exposed through the window of the used disk. A detent then engages the advancing edge of the window of the used disk so that continued rotation of the used disk against the force of the detent causes the weakened score line to rupture thus separating the inner and outer disk portions. The inner disk portion continues to rotate, idly, while the outer disk portion is retained in a stationary position by the detent.

The invention now will be described in detail with references to the accompanying drawings wherein.

Figure 1:
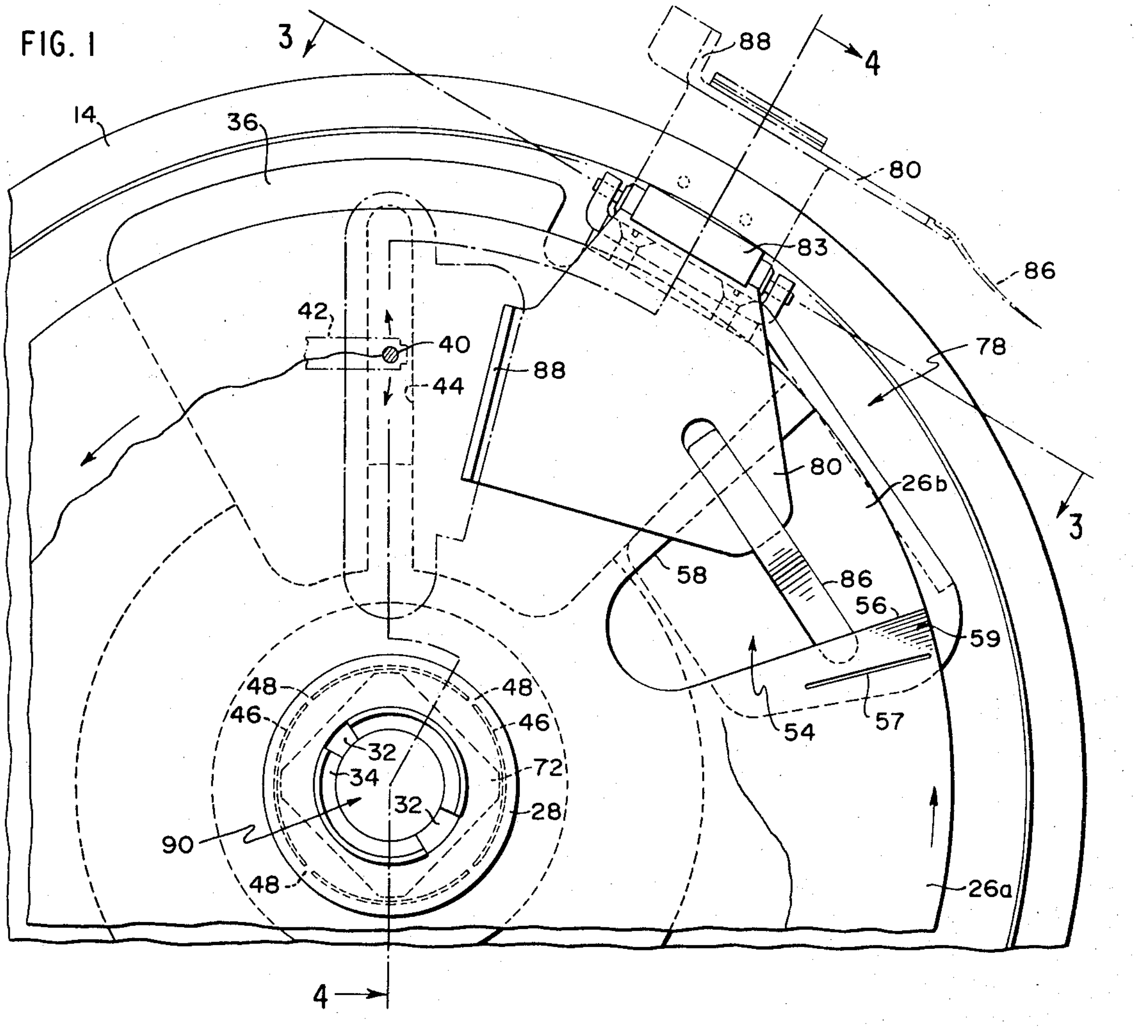
FIG. 1 illustrates in plan the stack of recording disks in the tachograph.

For ease of explanation in the following description of the invention, a direction indicated by the arrow 5 in FIGS. 3 and 4 will be referred to as "upward" and the opposite direction as "downward."

The tachograph, indicated generally by the reference character 10, is mounted in a convenient location in the truck or vehicle, as on the dashboard. Suitable connections are made of the tachograph in order to monitor the desired vehicle parameter. Tachographs of the type described are capable of monitoring a number of parameters simultaneously. For example, when engine functions, such as down time or r.p.m. are to be recorded, the input to the recorder is connected to the appropriate part of the engine. Similarly, if vehicle speed is to be recorded the input to the recorder may be connected to a convenient element in the drive train.

As shown in FIGS. 1 to 4, the tachograph 10 includes a housing 12 and a cover 14 which are connected at the hinge 16 to provide access to the interior elements of the tachograph 10. The cover 14 and housing 12 preferably mate closely to retard the entry of dirt or dust into the tachograph. Suitable locking mean (not shown) may be provided to lock the cover 14 to the housing 12. The cover 14 may house a conventional speedometer or tachometer (not shown).

Drive means (not shown) such as a timed motor or clock drive is mounted within the cover and is connected to a drive shaft 18 to which is secured a turntable 20 and integral spindle 22 to rotate the spindle and turntable at the desired speed. The stack 24 of disks 26 is supported on the turntable 20 and is secured thereto by a locking ring 28 having conventional radially extending pins 30 which extend into L-shaped slots 32 formed in the walls 34 of the spindle 22.

The turntable 20 is of smaller diameter than the disks 26 so that when the stack 24 is secured to the turntable 20 the disks 26 extend radially beyond the edge of the turntable 20 and rest on a writing table 36 which is secured, by the bracket 38, to the interior of the front cover 14. As the turntable 20 is rotated the disks 26 will rotate over the writing table 36. A stylus 40, is mounted to the housing 12 by means of the arm 42 which supports the stylus over the writing table 36. The stylus 40 is biased downwardly toward the writing table so that it may bear continually against the stack of disks. The arm 42 is supported by the housing for radial movement with respect to the stack of disks in response to the input signal. The writing table 36 may be provided with a radial slot 44 so that when the tachograph is idle and there are no disks on the turntable, the stylus will protrude into the radial slot 44 and will not bear against the writing table 36.

FIGS. 5 to 8 show the construction and arrangement of the disks 26 in the stack 24. The disks preferably are provided with a pressure sensitive charting surface which exhibits a mark solely in response to the pressure of the stylus 40. Each disk 26 has a weakened score line 46 which circumscribes the central axis of rotation of the disk. In the preferred embodiment of the invention, the score line 46 comprises a substantially continuous slit which is interrupted by a number of small, weak connective tabs 48. The score line 46 thus defines an inner disk portion 50 and an outer portion 52. The inner disk portion 50 of each disk 26 is intended to be secured to the spindle 22, as described below, so that the disks 26 may rotate in unison with the spindle 22 and turntable 20.

A window 54 is formed in the outer disk portion 52 of each disk 26. Although, in the preferred embodiment, the window 54 is of a general wedge shape, other configurations may be employed. The window is defined by a leading edge 56 and a trailing edge 58 which are disposed radially of the disk 26. An embossed raised line 57 (see FIG. 1) may be made adjacent the leading edge 56 to provide a raised leading edge portion 59 which insures that the leading edge 56 will be spaced from the underlying disk so that it will be engaged by a detent (described below). The beginning, reference line 60 of the chart on each disk 26 is located just after the leading edge 56 at the score line 57. The end of the chart on each disk 26 terminates at the trailing edge 58 of that disk. Thus, the recording arc along which the stylus tracks, is indicated by the reference character 62 and extends from the reference line 60 to the trailing edge 58 of the disk. The drive means is arranged to rotate the turntable 20 and the stack 24 of disks through an angle equal to one recording arc 62 in one time interval.

Figure 2:
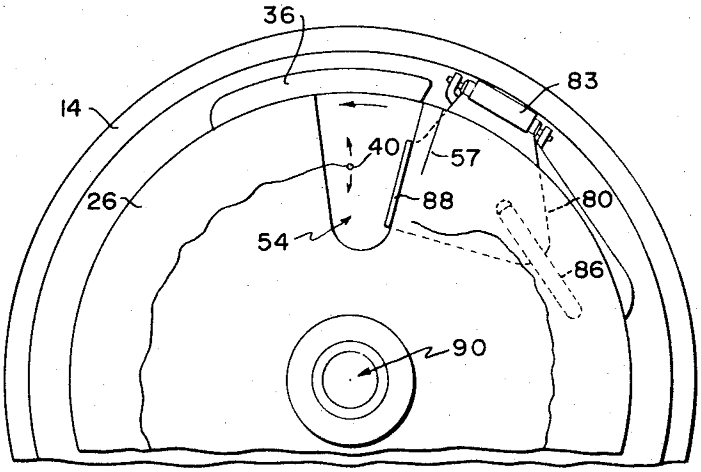
FIG. 2 is a simplified plan view of the tachograph illustrates the engagement of a chart disk with the detent of the tachograph.
Figure 3:
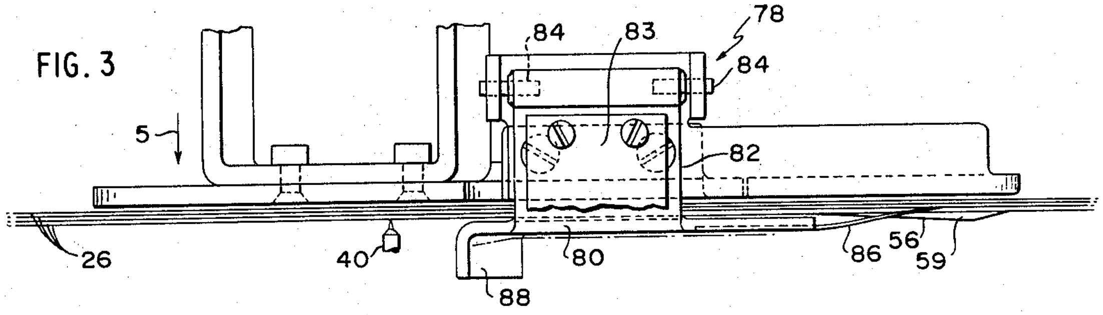
FIG. 3 is an elevation, in section, of the loaded tachograph as seen along the plane 3—3 of FIG. 1.
Figure 4:
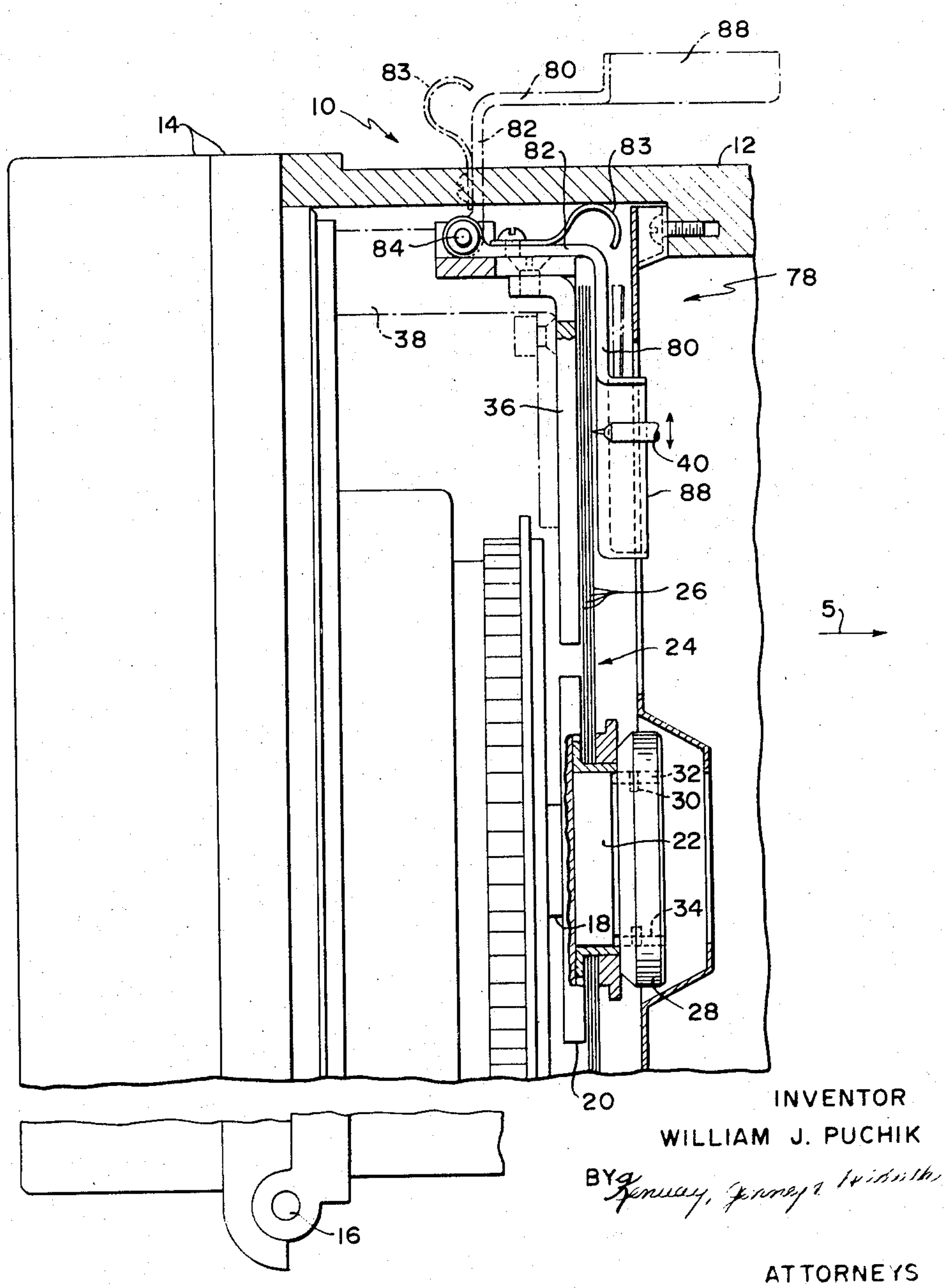
FIG. 4 is a sectional view of this loaded tachograph or viewed from the plane 4'4 of FIG. 1.
Figure 6:
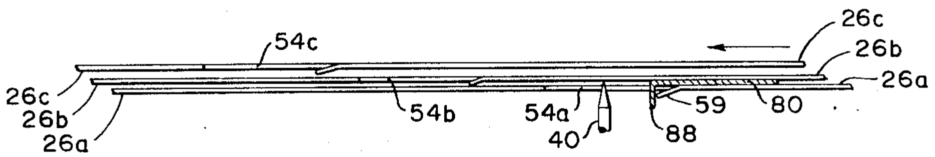
FIG. 6 is a developed edge view of the disks illustrating the manner in which the top disk is separated from the rotating stack.

The disks are arranged in the stack, as shown more clearly in FIGS. 3, 4 and 6 so that the window 54 of each disk 26 in the stack 24 is displaced angularly and at regular, equal intervals, in the direction of rotation, from the window 54 of the disk 26 immediately above. Thus, the window 54*b* of the second disk 26*b* is displaced angularly, in the direction of rotation, from the window 54*a* of the first disk 26*a*. Similarly, the window 54*c* of the disk 26*c* is displaced angularly with respect to the window 54*b* of the disk 26*b*. Each successive disk is oriented in the same manner so that none of the windows 54 overlap. Additionally, the trailing edge of each window 54 is disposed in alignment with the reference line 60 of the chart on the next succeeding disk, the leading edge 58 overlapping the next succeeding disk by the marginal edge portion 59. Thus, the beginning of the chart on each disk 26 is exposed through the window 54 of the preceding disk 26 so that the stylus 40 may ride directly off the trailing edge 58 of one disk on to the beginning of the chart of the next succeeding disk as shown in FIG. 2.

Figure 5:
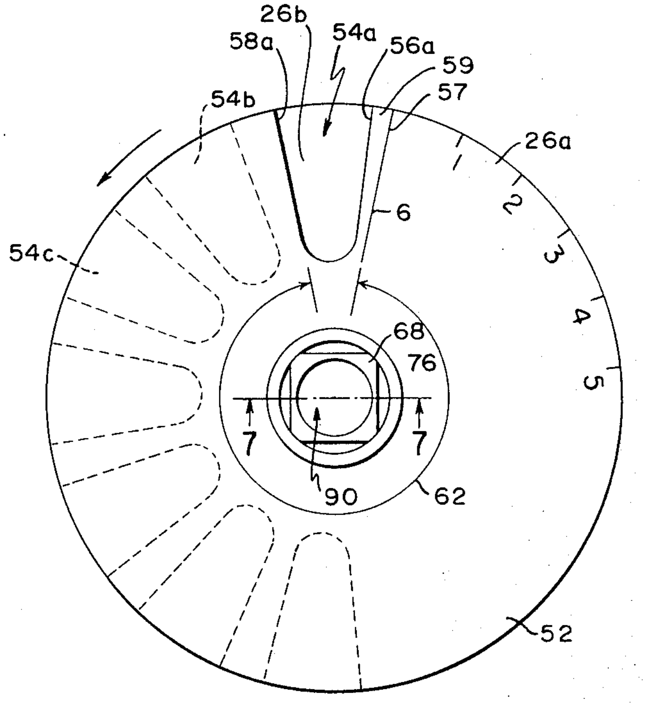
FIG. 5 is a plan view of a stack of charting disks as employed in the invention.
Figure 8:
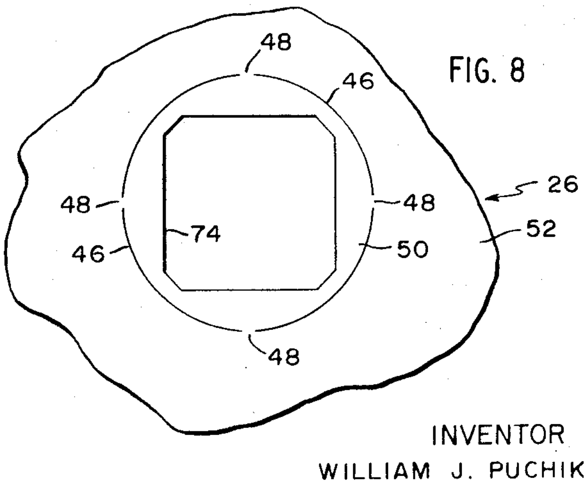
FIG. 8 is a plan view of the central region of one of the disks.
Figure 7:
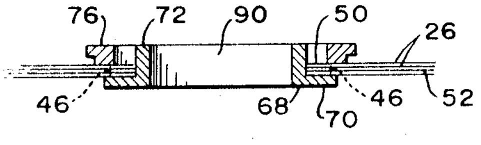
FIG. 7 is a cross-sectional view of the hub as seen along the line 7—7 of FIG. 5.

Referring to FIGS. 5 and 7, the disks are secured in this arrangement by means of a hub 68 which binds the disks 26 and which connects the stack 24 to the turntable 20 and spindle 22. The hub 68 includes a flange 70 and a boss 72 which is passed through the registered, central holes 74 of the stacked disks. In accordance with the invention, the connection between the inner disk portion 50 and hub 68 must be secure. As illustrated, this may be accomplished by providing a boss 72 of noncircular cross section (as square) with the central holes 74 of the disks 26 being of a mating configuration. Other arrangements for securing the inner disk portions 50 to the hub 68 will be apparent to those skilled in the art. It should be noted, however, that the foregoing arrangement facilities the initial assembly of the stack 24 in that no special jigs need be employed to orient properly the disks 26 with respect to each other. The noncircular shape of the boss 72 and central holes 74, serve as a registration guide, in themselves, to insure proper registration of the disks. The flange 70 should be large enough to extend over the score line 46 so that after the inner and outer disk portions have been separated the flange 70 will serve to retain the outer portions 52 in the stack 24. The disks 26 are secured on the hub 68 by means of a retaining ring 76 which is interference fitted onto the protruding end of the boss 72 on the other side of the stack 24. The retaining ring 76 also should extend diametrically beyond the score line 46 to retain the separated outer disk portions 52 in the stack 24.

The tachograph includes a detaching unit 78 which is mounted to the cover 14 and is disposed over the writing table 36. The detaching unit 78 is located in advance of the stylus 40 so that the leading edge 56 of any disk 26 may engage the detaching unit 78 before reaching the stylus. The detaching unit 78 is effective to engage the outer disk portion 52 of each used disk 26 so that continued rotation of the inner disk portion of that used disk will cause weak connective tabs 48 of that disk to rupture, thus severing the inner and outer portions of that disk 26.

As shown in FIGS. 1 and 4 the detaching unit 78 includes a plate 80 which is formed integrally with a bracket 82. The bracket 82 is hinged at the pins 84 to the bracket 38 so that the plate 80 may be raised (shown in phantom) to enable the disks to be loaded into the tachograph and lowered to an operative position in which the plate 80 is lowered over the writing table 36 so that the outer portion 52 of the disks 26 pass between the plate 80 and writing table 36.

A spring 83 is secured to the bracket 82 and is engageable with the inner surface of the housing 12 when the cover 14 is closed to bias the bracket 82 and its plate 80 in the position shown in FIG. 4. The end of the plate 80 to which an advancing disk first will be presented supports a resilient leaf or finger 86 which is arranged to be biased downwardly toward and into engagement with the uppermost disk 26 of the rotating stack at all times. As continued rotation of the uppermost disk approaches the end of its recording arc the window 54 of that disk 26 will be engaged by the finger 86 which slides under the leading edge 56 of that disk (see FIGS. 1 and 3). The leading edge then is guided over the finger 86, onto the plate 80 and into abutting engagement with a reverted detent 88 which receives the leading edge 56 of that disk and slope it (see FIG. 2). Continued rotation of the stack, after the leading edge 56 has engaged the detent 88, causes the connective tabs 48 of that disk to rupture, and the remaining, lower disks in the stack continue to rotate as shown in FIG. 6. The detent 88 is disposed with relation to the stylus 40 so that when a disk 26 has been stopped, the stylus 40 will be disposed within its window 54 so that it may bear against the next lower disk 26 in the stack 24.

The operation, the tachograph 10 is set up by placing the stack 24 on the turntable with the spindle protruding through the hub 90 in the hub 68 and the stylus 40 on the reference line 60. The hub then is secured to the spindle 22 by the locking ring 28.

After the stack 24 has been inserted and properly oriented, the drive means rotates the stack through one recording arc 62 during the given time interval. In a 7-day recorder employing seven charting disks the recording arc 62 would be rotated past the stylus 40 in 1 day. After the stack has been rotated through the time interval the stylus then passes over the trailing edge 58 of the first disk and drops onto the beginning of the charting surface of the second disk which is exposed through the window 54 of the first disk. Although the stylus then is tracking on the second disk, the entire stack 24, including the first disk 26, continues to rotate until the detent 88 engages the leading edge 54 of the first disk. The continued force of rotation of the hub 68 urges the outer disk portion 52 against the detent 88 until the connective tabs 48 rupture, thus causing the inner and outer disk portions 50, 52 to separate. The separated inner disk portion 50 continues to rotate with the turntable 20 and spindle 22 while the outer disk portion 52 is maintained in a stationary position by the detent 88 so that the stylus 40 may track radially within the window 54 of the stationary disk. The spindle 22 continues to rotate the remaining, unseparated disks 26 with the stylus 40 tracking on the second disk which is rotated in exposure beneath the stationary window 54 of the separated disk. The second disk will continue to rotate until its leading edge 54 is rotated into abutment with the detent 88 at which time the inner and outer disk portions 50, 52 of the second disk will rupture, the window 54 of the second disk being in registry with the window 54 of the first disk 26. Operation of the device continues until each disk has been used at which time all of the windows 54 will be in registry and in engagement with the detent 88. The stack 24 then may be removed from the recorder and replaced with a fresh stack.

It may be desirable, in some instances to fabricate the stack so that the bottom disk in the stack has no window. In this arrangement the stylus will continue to track on the last disk until the tachograph is stopped or the stack of disks is changed. This last windowless disk may be employed to record data or maybe employed simply as a backup disk to prevent the stylus from protruding beyond the bottom of the stack.

It should be noted that the foregoing description is intended merely to be illustrative of my invention and that other embodiments and modifications thereof will be apparent to those skilled in the art and familiar with the principle herein set forth, and that such may be made without departing from the spirit of the invention. For example, the disks have been described as including a pressure-sensitive charting surface which becomes marked in response to the pressure of the stylus. It should be noted that other writing mediums may be employed such as electrosensitive, heat sensitive or even ink writing papers. Additionally, it should be noted that although the invention has been described with reference to a "7-day" recorder, it may be used in any application where long term, unattended recording is required.

Having thus described my invention what I desire to claim and secure by Letters Patent is:

1. A recording chart comprising:
   - a plurality of rotatable recording disks arranged in a stack for rotation about a common, central axis;
   - each disk having an inner and outer disk portion, defined by a weakened score line circumscribing said common axis, said inner disk portion being adapted to be mounted securely to a rotary driving element for rotation in unison with said driving element, said outer disk portion being rotatable in unison with its associated inner disk portion; and
   - means responsive to engagement of a detent member with said outer disk portion for separating said outer disk portion from its associated inner disk portion whereby contained rotation of said separated outer disk portion will terminate while said inner disk continues to rotate.

2. A recording chart as defined by claim 1 wherein the weakened score line is provided by:
   - each of said disks having a slit circumscribing its axis of rotation, said slit being interrupted by a plurality of weak connective tabs, thereby defining an inner disk portion within said slit.

3. A recording chart as defined in claim 1 wherein said means mounting said inner disk comprises:
   - said inner disk portions having irregularly shaped holes formed centrally thereon, said holes being receptive to an irregularly shaped drive member.

4. A recording chart as defined in claim 3 wherein said drive member comprises:
   - a hub having integral flange and boss portions, said boss portions being of said irregular cross-sectional shape and being adapted to protrude through said irregularly shaped holes in said disks, said flange bearing against one side of said stack of disks; and
   - a retaining ring adapted to be connected with the protruding end of said boss on the other side of said stack of disks to retain said disks on said hub.

5. A stackable recording element for use in a rotatable recorder comprising:
   - a disk having an inner disk portion and an outer disk portion, said portions being defined by a weakened score line circumscribing the central axis of rotation of said disk;
   - means enabling the inner portion of said disk to be secured to a rotatable driving element whereby said inner and outer portions of said disk may be separated in response to continued rotation of said inner disk while said outer disk is precluded from rotation; and
   - an inner edge on said outer disk portion adapted to be engaged by a fixed detent to preclude rotation of said outer disk portions.

6. A recording element as defined in claim 5 wherein said disk includes a window formed in said outer disk portion, said window being defined in part by a substantially radial edge, said radial edge comprising said edge adapted to be engaged by said fixed detent.

7. A recording chart comprising:
   - a plurality of rotatable recording disks arranged in a stack for rotation about a common axis;
   - each disk having an inner and outer disk portion, said inner portion being adapted to be mounted securely to a rotary driving element for rotation in unison with said driving element; said outer disk portion being rotatable in unison with its associated inner portion;
   - each disk further having a window formed in said outer portion to expose the next, lower disk in said stack, said disks being arranged in said stack so that the window of each disk is displaced angularly in the direction of rotation from the window of the preceding disk in the stack so that none of said windows are in registry with each other;
   - each of said windows having an edge engageable with a fixed detent past which said stack may be rotated, said edges being arranged to preclude further rotation of said outer disk when rotated into engagement with said detent; and
   - means including a weakened score line circumscribing said common axis responsive to said engagement of said window edge to separate said inner and outer disk portions of said disk whereby the remaining, lower unseparated disk will continue to rotate in unison, the uppermost of said rotating disks rotating past the stationary window of said separated disks.